United States Patent [19]

Barrett

[11] 4,428,475
[45] Jan. 31, 1984

[54] HEAVY MATERIAL CONVEYOR BELT WEAR PROTECTION

[75] Inventor: William T. Barrett, Waukesha, Wis.
[73] Assignee: Wehr Corporation, Milwaukee, Wis.
[21] Appl. No.: 326,566
[22] Filed: Dec. 2, 1981
[51] Int. Cl.³ .............................................. B65G 15/58
[52] U.S. Cl. .................... 198/699; 198/690; 209/930
[58] Field of Search ............... 198/690, 698, 699, 850; 271/275, 198; 209/636, 930

[56] References Cited

U.S. PATENT DOCUMENTS

| | | | |
|---|---|---|---|
| 933,365 | 9/1909 | Cory et al. | 198/846 |
| 3,288,273 | 11/1966 | Michaelson | 198/850 |
| 3,482,689 | 12/1969 | Palm | 209/636 |
| 3,895,982 | 7/1975 | Persson | 198/688 |
| 3,935,947 | 2/1976 | Barrett | 209/636 |
| 4,008,799 | 2/1977 | Barret | 198/698 |

FOREIGN PATENT DOCUMENTS 108936  8/1917  United Kingdom .
693198  6/1953  United Kingdom .

Primary Examiner—Joseph E. Valenza
Assistant Examiner—Jonathan D. Holmes

[57] ABSTRACT

A wear protected belt comprising an elongated, generally flexible belt having a plurality of plates attached to the face of the belt. The plates extend across the belt at an angle to its longitudinal axis, and substantially cover a longitudinal portion of the belt. Each plate has a first plate portion, or rib, which projects laterally from the face of the belt. Attached to the rib is a second plate portion, or top which projects from the rib and extends over a portion of the belt parallel but spaced from the face of the belt. Disposed between the top of the plate and the belt surface is a shock absorbing bar means, or bar. When heavy objects impact the top of the plate, the top of the plate engages the bar and the bar absorbs the force of the impact. The bar also resists shearing or bending forces on the plate by bearing against the top of the plate and thereby resisting turning motions on the plate.

7 Claims, 3 Drawing Figures

HEAVY MATERIAL CONVEYOR BELT WEAR PROTECTION

BACKGROUND OF THE INVENTION

This invention relates to conveyor belts and, more particularly, to wear protection means on the belts for reducing excessive belt wear.

Current belt protection means for conveyor belts used on magnetic separators and the like provide adequate protection against impacts from light objects weighing less than about 8 pounds. If these belts are subjected to impacts from heavier objects, conventional wear protection means either bend or pull away from the belt resulting in failure to the belt protection means, and ultimately failure of the belt itself.

Examples of belt protection means known in the art are disclosed in the patents listed below. Most involve either the use of replaceable wear pads or generally flat steel plates to protect the belt surface, which prove to be inadequate protection means for belts subjected to impacts from heavy objects.

| Patent No. | Inventor | Date Issued |
|---|---|---|
| U.S. Pat. No. 4,008,799 | Barrett | Feb. 22, 1977 |
| U.S. Pat. No. 3,935,947 | Barrett | Feb. 3, 1976 |
| U.S. Pat. No. 3,895,982 | Persson | July 22, 1975 |
| U.S. Pat. No. 3,288,273 | Michaelson | Nov. 29, 1966 |
| U.S. Pat. No. 933,365 | Corey | Sept. 7, 1909 |
| British 108,936 | Bibby | Aug. 30, 1917 |
| British 693,198 | Aumund | June 24, 1953 |

SUMMARY OF THE INVENTION

An object of this invention is to provide an economical and simple to maintain means for protecting a conveyor belt from excessive wear. Another object is to provide a means to protect conveyor belts from damage resulting from heavy objects which collide with the belt, especially when used with a magnetic refuse separator.

For the achievement of these and other objectives, this invention provides an elongated, generally flexible belt having a plurality of plates attached to the face of the belt. The plates extend across the belt at an angle to its longitudinal axis, and generally cover a longitudinal portion of the belt. Each plate has a first plate portion, or rib, which projects laterally from the face of the belt. Attached to the rib is a second plate portion, or top which projects from the rib and extends over a portion of the belt parallel but spaced from the face of the belt. Disposed between the top of the plate and the belt surface is a shock absorbing bar means, or bar. When heavy objects impact the top of the plate, the top of the plate engages the bar and the bar absorbs the force of the impact. The bar also resists shearing or bending forces on the plate by engaging the top of the plate and thereby resisting turning motions on the plate.

DESCRIPTION OF THE PREFERRED EMBODIMENT

Figure 1:
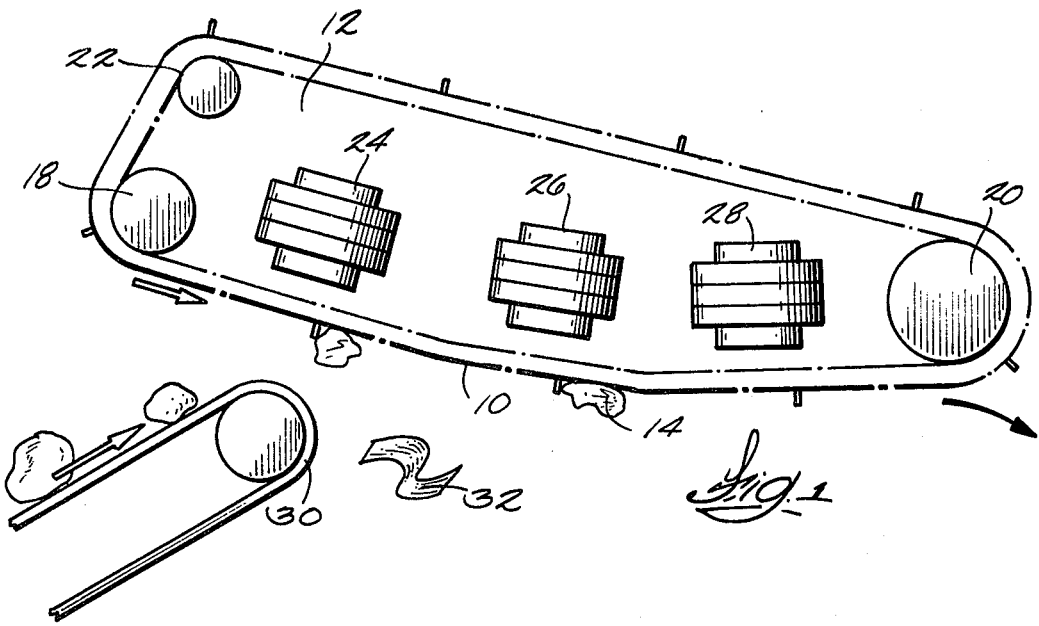
FIG. 1 is a side view of a magnetic refuse separator incorporating a belt structure in accordance with this invention.

While the wear protected conveyor belt of this invention can be used in various applications where heavy materials impinge and damage a moving belt or its protective surface, it is particularly adaptable for use on a magnetic separator used for separating magnetic material from solid waste, so the invention will be described for that application. Referring to FIG. 1, the wear protected conveyor belt 10 of this invention is shown mounted on a conventional magnetic refuse separator 12 used for separating magnetic materials 14 from solid waste or refuse. The conveyor belt 10 includes an endless belt 16, made from polyurethane or other suitable flexible material, which is trained over head and end pulleys 18 and 20 and an idler pulley 22. The belt 10 thus has both an upper and a lower generally horizontal extension. The belt 10 is driven through a continuous path in a counterclockwise direction by a conventional drive mechanism (not shown) which is connected to the head pulley 18.

The separator includes a magnetic field generating arrangement located in the area defined by the belt 10, with the magnetic field being generated near the lower horizontal extension of the belt 10. The magnetic arrangement includes a series of magnets 24, 26, and 28 which are used to attract magnetic materials 14 to the belt and then to continue to attract the materials to the belt as the belt and materials move across the working face of the magnetic separator.

Solid waste or refuse is delivered to an area below the pick up magnet 24 of the magnetic separator by a supply conveyor 30. Magnetic materials 14 attracted to the conveyor belt 10 on the separator are carried along by the belt and then discharged into a suitable collection area.

The non-magnetic portion of the refuse 32 falls away from the end of the supply conveyor and is collected separately from the magnetic materials.

When the separator is used to separate heavy magnetic materials from other refuse, the conveyor belt can be subjected to significant forces resulting from the impact of these heavy objects attracted to the belt. These impacts tend to either deform conventional wear protection means on the belt or to tear the wear protection means from the belt.

The wear protection means provide by this invention includes a plurality of plates 34 attached to the outer face 38 of the belt 16 and associated shock absorbing bar means 36.

The plates 34 include a first plate portion, or rib 40, which projects laterally from the face 38 of the belt 16, and a second plate portion, or top 42, which is attached to the rib. The top 42 projects from the rib 40 generally parallel to but spaced from the belt's face 38, with the top then covering or overlapping a portion of the face of the belt. The plates are positioned close to each other so an entire longitudinal portion of the belts suface is substantially covered with plates, thus protecting the belt from direct contact of materials transported by the belt.

The rib 40 is attached to the belt 16 by any conventional means, such as by the use of rivets or screws 44. The rib and top of the plate may be integrally formed together as a one-piece unit, or otherwise attached by any conventional means. In a preferred embodiment, the rib 40 is attached to the central portion of the top portion of plate 42, with the plate thus assuming a "T" shape. This shape is especially resistant to deformation resulting from forces imparted to the plate normal to the outer surface of the top. The plates 34 are made of a relatively rigid, impact and wear resistant material, such as steel. In connection with the use of the belt wear protection with a magnetic separator, the material needs to be non-magnetic, like stainless steel.

The major portion of magnetic materials impinging on the wear protected belt 10 tends to accumulate in the central area of the belt. Recognizing that fact, the plates are shorter than the overall width of the belt 16 so as not to cover the entire width of the belt 16. The outer ends of the plates 34 are spaced inwardly of the longitudinal belt edges leaving exposed areas of the belt between those edges and the marginal edges of the belt. For example, in a conventional belt 60 inches in width, the plates are approximately 24 inches wide and centered on the belt leaving an 18 inch space along either edge of the belt.

This affords optimum belt wear protection with the minimum amount of additional material being added to the basic belt.

Disposed between the top of the plate 42 and the belt's face 38 is a shock absorbing bar means, or bar 36. The bar is located between each of the adjacent plates. The bar 36 is made of a resilient shock absorbent material such as vulcanized rubber. When a object strikes the top of a plate, the top then engages the bar 36 which compresses to absorb the force imparted to the plate by the object. If an object strikes a plate at anything other than an angle normal to the top surface of the plate, a torque or turning motion is imparted to the plate which tends to cause the rib to be pulled away from the belt. Because the plate turns along the axis of the plate's rib, the plate's top 42 engages the bar 36 and the bar absorbs the turning motion thereby preventing the plate from being pulled from the belt.

The bar 36 is retained between the top of the plate and the belt face by attaching the bar to the belt by using screws or rivets 46, or by securing the bar by using some other conventional means.

Figure 2:
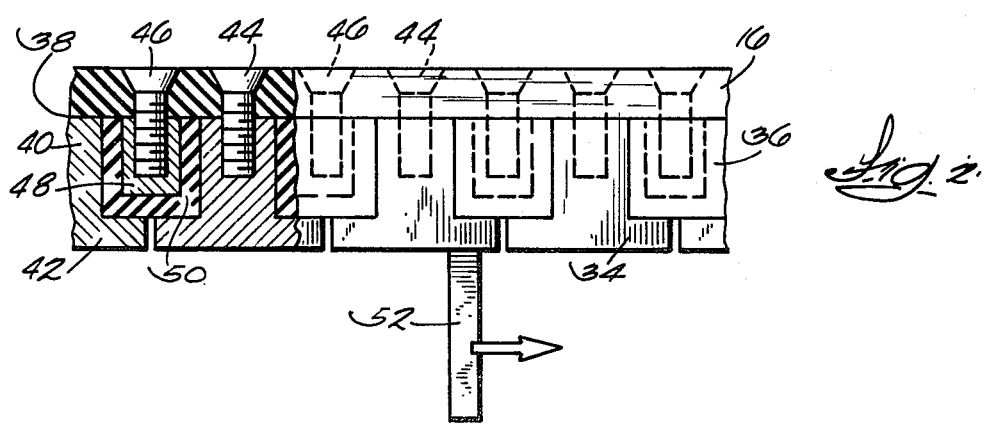
FIG. 2 is a cross section through the belt of FIG. 1 taken generally along line 2—2 of FIG. 3.
Figure 3:
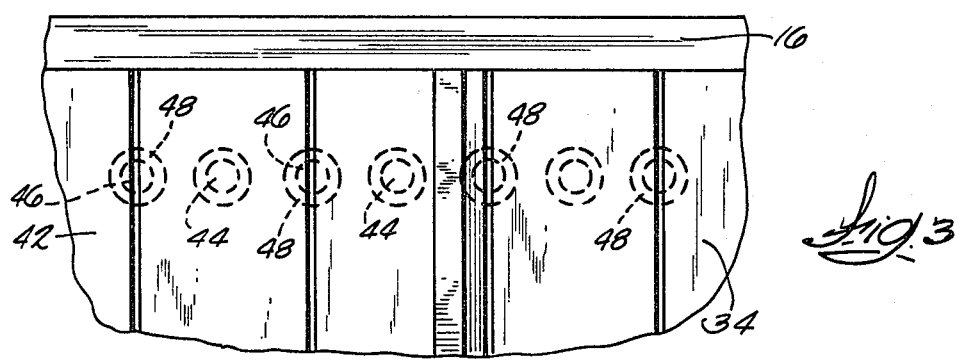
FIG. 3 is a plain view of a portion of the belt illustrated in FIG. 1.

In order to insure that the bar 36 will maintain its structural integrity without adversely affecting its shock absorbing characteristics, the bar can include an inelastic portion 48 and an elastic portion 50, with the elastic portion 50 disposed between the inelastic portion 48 and the top of the plate 42. In the preferred embodiment, the elastic portion 50 is retained in place by having the elastic portion molded around the sides of the inelastic portion 48, as illustrated in FIG. 2. The inelastic portion is made of a durable rigid material such as steel, while the elastic portion is made of a shock absorbing material such as vulcanized rubber.

Cleats 52 are provided on the wear protected belt's surface in a magnetic separator environment to insure that articles attracted to the belt move with the belt through the magnetic field. Generally, these cleats 52 are either molded integrally with or otherwise suitable attached to the plates 34 attached to the belt. In the preferred embodiment of this invention, cleats 52 are provided by brackets attached to the top of selected ones of the plates, and extend laterally from the general plane of the belt, specifically normal to the belt surface and extending across the longitudinal axis of the belt. The cleats are spaced along every five or six plates in the direction of the longitudinal axis of the belt, with a number of plates then convering the belt surface between cleats. Again recognizing the fact that the majority of the attracted waste will be located in the area of the plates, the cleats extend only the width of the plates and not the entire width of the belt.

The cleats are generally made of the same material as the plates so that the cleats too are basically wear resistant.

In convenional conveyor belt construction metal splices are often used to attached the two ends of a belt to make it a closed loop. When these splices are subjected to impacts from heavy objects, they often fail. For this reason, the belt 16 of this invention preferably is in the form of a continuous closed loop or a one-piece unit without any mechanical splices.

Although this invention has been illustrated and described in connection with particular embodiments thereof, it will be apparent to those skilled in the art that various changes and modifications may be made therein without departing from the spirit of the invention or from the scope of the attached claims.

I claim:

1. A wear protected belt comprising, in combination, an elongated, generally flexible belt, having a face and a longitudinal axis,
a plurality of plates attached to and substantially covering a longitudinal portion of said belt, with each of said plates extending across the face of said belt at an angle to the longitudinal axis of said belt, said plates comprising:
a first plate portion which projects laterally from the face of said belt,
a second plate portion attached to and projecting from said first plate portion generally parallel to but spaced from and over-lapping a portion of said belt, and
a resilient shock absorbing bar means disposed between said second plate portion and said belt so that articles impacting on said second plate portion cause said second portion to engage said bar means and said bar means absorbs said impact.

2. The belt of claim 1 which further comprises cleats attached to said second plate portions, projecting outward from said second plate portions, with said cleats being spaced along the longitudinal axis of said belt and extending across a longitudinal portion of said belt at an angle to the longitudinal axis of said belt.

3. The belt of claim 1 wherein the second plate portion has a central portion, and said first plate portion is attached to the central portion of said second plate portion.

4. The belt of claim 1 wherein said plates are made from non-magnetic material.

5. The belt of claim 1 wherein said shock absorbing bar means comprises:
an inelastic portion, and
an elastic portion, with said elastic portion disposed between said inelastic portion of said bar means and said second plate portion.

6. The belt in claim 1 wherein the plates are spaced inwardly from the longitudinal edges of said belt so that said plates cover a central portion of said belt and leave an area of said belt adjacent to the longitudinal edges thereof exposed.

7. A wear protected belt comprising, in combination, an elongated, generally flexible belt containing no mechanical splices, having a face and a longitudinal axis, a plurality of plates attached to and substantially covering a central longitudinal portion of said belt, with each of said plates extending across the face of said belt at an angle to the longitudinal axis of said belt, said plates comprising:

a first plate portion which projects laterally from the face of said belt, and a second plate portion attached to a central portion of said first plate portion, which projects from said first plate portion generally parallel to but spaced from and over-lapping a portion of said belt, a resilient shock absorbing bar means disposed between said second plate portion and said belt so that articles impacting on said second plate portion cause said second portion to engage said bar means and said bar means absorbs said impact, said bar means comprising an inelastic portion and an elastic portion, with said elastic portion disposed between said inelastic portion of said bar means and said second plate portion, and cleats attached to said second plate portions, projecting outward from said second plate portions, with said cleats being spaced along the longitudinal axis of said belt and extending across a central longitudinal portion of said belt at an angle to the longitudinal axis of said belt.

* * * * *